(12) United States Patent
Akatsuka et al.

(10) Patent No.: US 7,710,243 B2
(45) Date of Patent: May 4, 2010

(54) DRIVER-ASSISTANCE VEHICLE

(75) Inventors: Koji Akatsuka, Saitama (JP); Hiroshi Uematsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 11/476,439

(22) Filed: Jun. 28, 2006

(65) Prior Publication Data

US 2006/0290479 A1    Dec. 28, 2006

(30) Foreign Application Priority Data

Jun. 28, 2005    (JP) ............................. 2005-188100

(51) Int. Cl.
*B60Q 1/00*    (2006.01)
(52) U.S. Cl. .................... 340/425.5; 340/438; 340/439; 340/458; 340/461; 340/465
(58) Field of Classification Search ................ 340/468, 340/425.5, 465, 472, 475, 431, 463, 479, 340/432, 478, 438, 439, 575, 576, 458, 461; 359/853
See application file for complete search history.

(56) References Cited

U.S. PATENT DOCUMENTS 5,497,304 A * 3/1996 Caine .......................... 362/485
6,677,856 B2 * 1/2004 Perlman et al. ............. 340/468
6,686,845 B2 * 2/2004 Oyama ....................... 340/575
6,700,502 B1 * 3/2004 Pederson ................ 340/815.45
6,918,876 B1 * 7/2005 Kamiyama .................. 600/447
6,992,572 B1 * 1/2006 Lovegrove .................. 340/432
7,002,458 B2 * 2/2006 Su ............................. 340/465
7,119,672 B2 * 10/2006 Subbaraman ............... 340/465

FOREIGN PATENT DOCUMENTS

| JP | 8-241499 | 9/1996 |
|---|---|---|
| JP | 10-148534 | 6/1998 |
| JP | 2004-178367 | 6/2004 |
| JP | 2005-1582 | 1/2005 |

OTHER PUBLICATIONS

Japanese Office Action for Application No. 2005-188100, dated Sep. 9, 2009.

* cited by examiner

*Primary Examiner*—Anh V La
(74) *Attorney, Agent, or Firm*—Lahive & Cockfield, LLP; Anthony A. Laurentano, Esq.; Matthew T. Fagan, Esq.

(57) ABSTRACT

Disclosed is a driver-assistance vehicle including one or more lighting members which are placed within peripheral vision of a driver and which are arranged on respective sides of the vehicle. Furthermore, the driver-assistance vehicle includes a vehicle behavior sensing unit for predicting or sensing a state of the vehicle, and a light controller for controlling the lighting members, based on the sensed state. With this driver-assistance vehicle, the driver can be assisted in distributing his attention.

8 Claims, 15 Drawing Sheets

MOVING OBJECT

DRIVER-ASSISTANCE VEHICLE

CROSS-REFERENCE TO RELATED APPLICATIONS

This application claims the benefit of Japanese Patent Application 2005-188100 filed on Jun. 28, 2005, the disclosure of which is incorporated herein by reference.

BACKGROUND OF THE INVENTION

1. Field of the Invention

The present invention relates to a driver-assistance vehicle which allows a driver to distribute his attention to several areas while driving.

2. Description of the Related Art

Generally, while driving a vehicle, the driver must pay attention not only to his front area but also to surrounding areas. Specifically, the driver needs to distribute his attention to several areas appropriately in response to the action of the vehicle. To demonstrate, when trying to turn left at an intersection, the driver is required to pay attention to other vehicles approaching behind the left side and pedestrians walking across the intersection. Moreover, when trying to change lane, the driver needs to sufficiently pay attention to other vehicles on the lane which the vehicle will enter, mostly vehicles within his blind space.

Accordingly, when changing direction or lane, it is preferable that the driver surely checks the state on the road while facing in the direction where the vehicle will head, rather than glances on the road. However, some drivers, mostly beginner drivers intend to neglect this check.

Conventionally, in order to assist a driver in distributing his attention, a system disclosed by Japanese Unexamined Patent Application Publication 2004-178367 has been presented. This system determines a preferable area for paying attention, based on its surroundings. Subsequently, the system senses the location where the driver currently pays attention. Finally, the system informs the driver if the determined area and the sensed location differ.

While this system employs an advanced sensing process technique, it does not specify a way to inform a driver clearly. Take this disadvantage into account, the present invention has been conceived. An object of the present invention is to provide a driver-assistance vehicle with a simple structure which assists a driver in distributing his attention by attracting his awareness.

SUMMARY OF THE INVENTION

According to an aspect of the present invention, there is provided, a driver-assistance vehicle comprising:

one or more lighting members being placed within peripheral vision of a driver, wherein the driver is assisted in distributing his attention.

According to another aspect of the present invention, there is provided, a driver-assistance vehicle comprising:

one or more regions being painted a color of a high attention value, the regions being arranged within peripheral vision of a driver, wherein the driver is assisted in distributing his attention.

With the above-described driver-assistance vehicle, the driver can be assisted in distributing his attention to several areas, when the vehicle changes direction or lane.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A detailed description will be given below, of first to fourth embodiments of the present invention, with accompanying drawings.

First Embodiment

Figure 1:
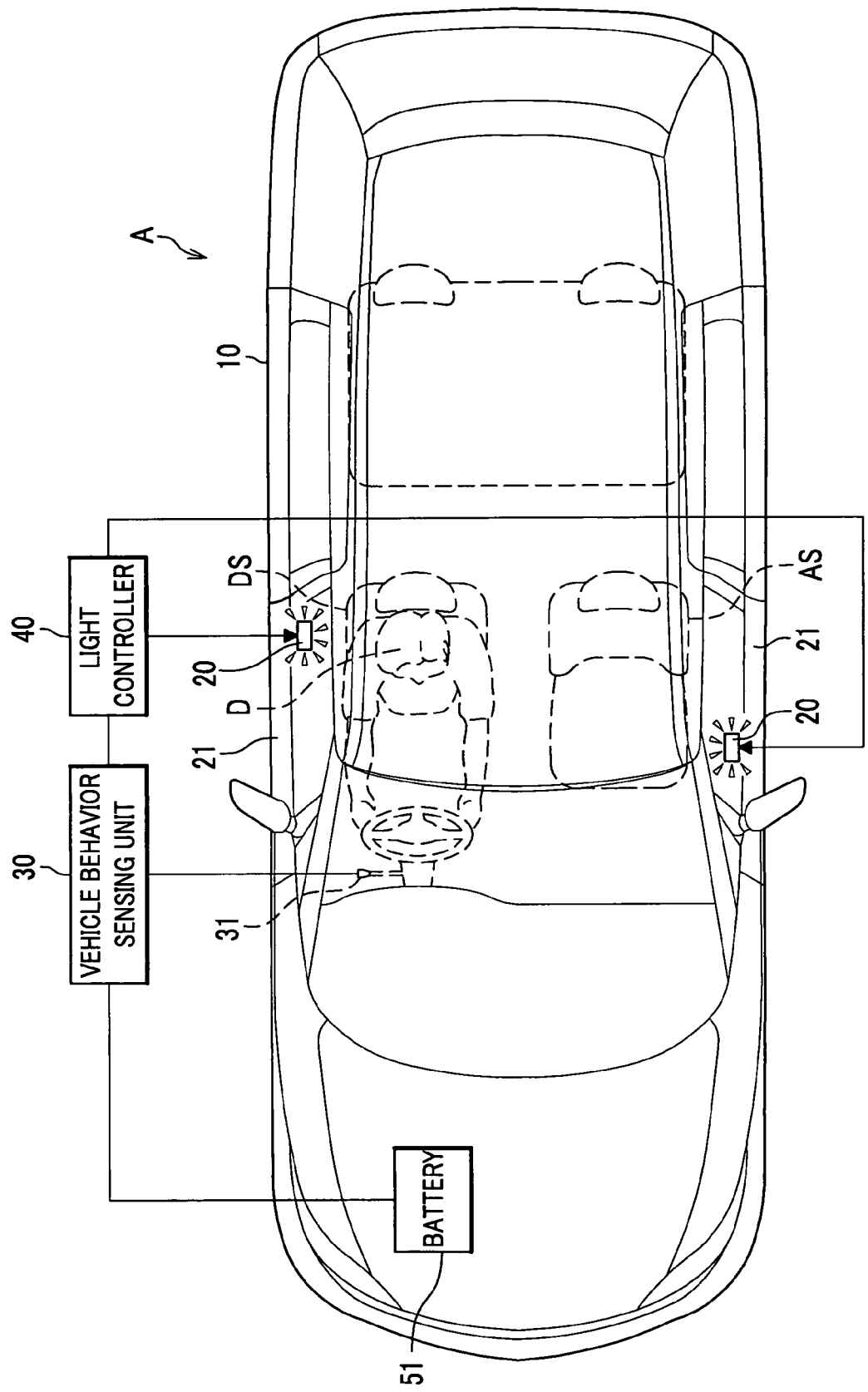
FIG. 1 is a plane view depicting a driver-assistance vehicle according to a first embodiment of the present invention.
Figure 2:
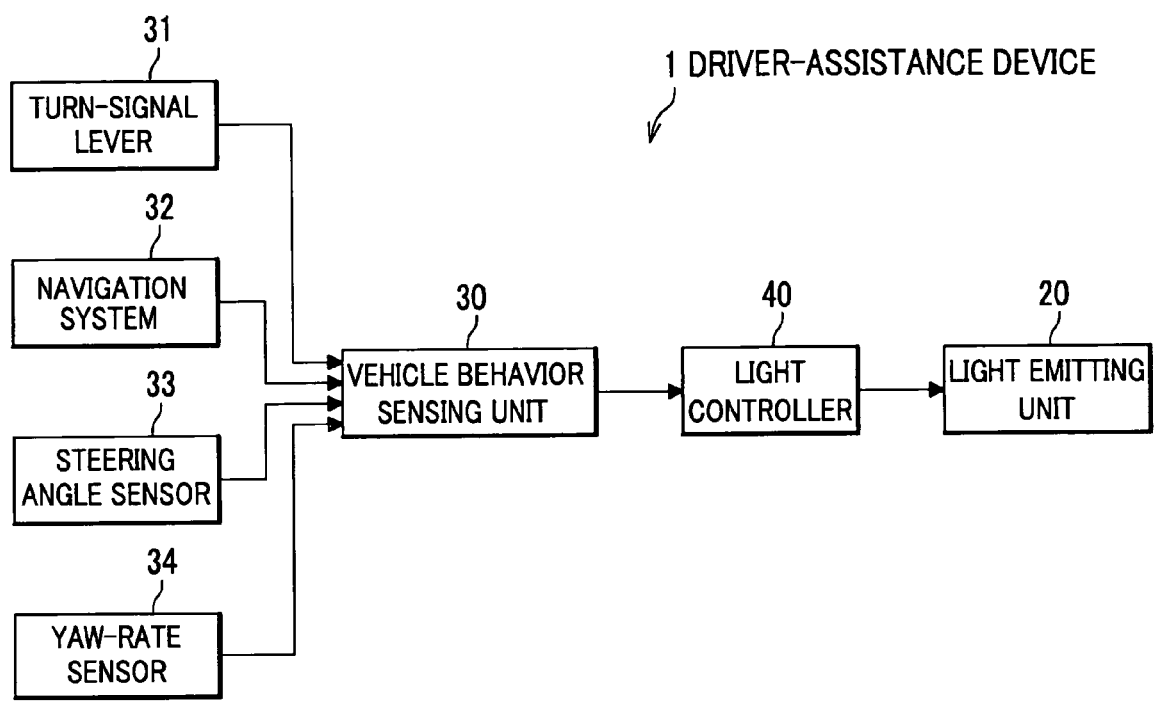
FIG. 2 is a block diagram depicting a driver-assistance device according to the first embodiment.

Referring to FIGS. 1 and 2, a driver-assistance vehicle A is equipped with a driver-assistance device 1. In addition, the driver-assistance device 1 includes a vehicle 10, a pair of light emitting units 20 and 20 arranged on the respective sides of the vehicle 10, a vehicle behavior sensing unit 30 for sensing the state of the vehicle 10, and a light controller 40 for controlling the light emitting units 20 and 20.

The vehicle 10 may be a typical vehicle, and it may be of any type as long as containing a passenger space. The vehicle 10 includes a battery 51 which supplies electric power to the driver-assistance device 1 (see FIG. 2).

Figure 3A:
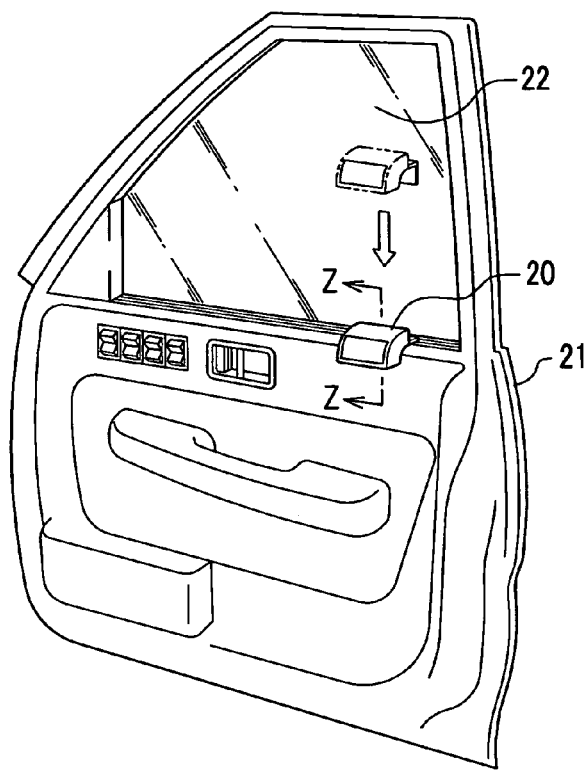
FIG. 3A is a view depicting a right door of the driver-assistance vehicle with a light emitting unit.
Figure 3C:
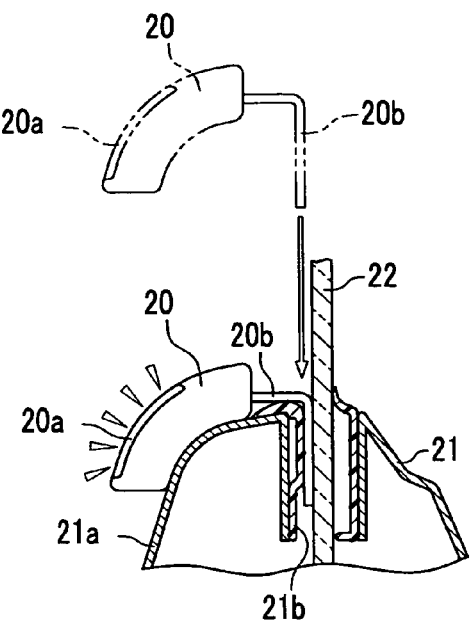
FIG. 3C is a cross-section view depicting the light emitting unit.
Figure 3B:
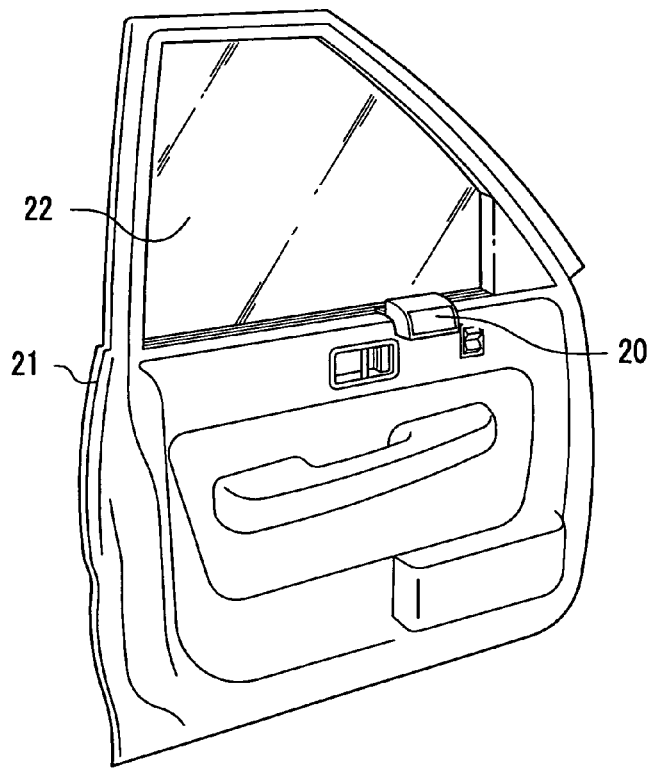
FIG. 3B is a view depicting a left door of the driver-assistance vehicle with the light emitting unit.

Each light emitting unit 20 may be a light emitting diode (LED), incandescent lamp or fluorescent light, and both units 20 and 20 are arranged below the windows on the front doors 21 and 21, respectively, as shown in FIGS. 3A and 3B. In these embodiments, front, back, right and left directions correspond to those seen from a driver D inside the vehicle 10. The right one of the light emitting units 20 and 20 is placed just beside a head of the driver D, as shown in FIG. 1. Meanwhile, the left one is located about 30 cm to 50 cm forward from the right light emitting unit 20. This location enables the driver D to views it easily even if a passenger sits on an assistant driver's seat AS. Preferably, both units 20 and 20 are arranged at substantially the same height as the ears of the driver D. Alternatively, the light emitting units 20 and 20 may be placed slightly behind driver D. This is because when trying to change direction or lane, the driver D faces in the direction where the vehicle 10 will head. Therefore, even if being placed slightly behind the driver D, the light emitting unit 20 stays within the peripheral vision of the driver D.

Referring to FIG. 3C, the light emitting unit 20 includes a unit main body 20a for containing a light source, and a locking member 20b for fixing the unit main body 20a to the front door 21 and locking it thereon. The front door 21 is provided with a door trim board 21a on the inner side, and an inner weather strip 21b is provided between the door trim board 21a and the window glass 22 in order to block water therefrom. The locking member 20b extends laterally from the unit main body 20a and is curved downward. In other words, the locking member 20b forms an L shape. The lower portion of the locking member 20b is inserted between the window glass 22 and the inner weather strip 21b, thereby locking the unit main body 20a on the front door 21.

Owing to this structure, the light emitting unit 20 can be shifted depending on the location of the driver D. This ensures the effect of the driver-assistance device 1. Nevertheless, the light emitting unit 20 may not be shifted. In this case, the light emitting unit 20 may be placed in contact with the door trim board 21a.

It is preferable that the light emitting unit 20 shines with a color of a high attention value such as yellow, orange or red. In addition, the left one of the light emitting units 20 and 20 gives off stronger light than the right one. Alternatively, the left one has a larger active area than that of the right one. This is because the left one is farther away from the driver D than the right one.

The vehicle behavior sensing unit 30 senses the state of the vehicle 10 in order to determine the emission timing of the light emitting units 20 and 20.

Referring to FIG. 2, the vehicle behavior sensing unit 30 may sense the mode of a turn-signal lever 31, the data from a navigation system 32, the steering angle from a steering angle sensor 33, and the yaw rate value from a yaw-rate sensor 34. These pieces of information may be used independently or in combination.

The vehicle behavior sensing unit 30 may sense the mode of the turn-signal lever 31 by detecting ON/OFF of the connection node of the turn-signal lever 31. When the node is turned ON, the vehicle 10 is determined to change direction or lane. Following this, when the node is turned OFF, it is determined to finish the change.

If the information from the navigation system 32 is used, then the vehicle behavior sensing unit 30 may monitor a route being pre-set by the system 32 and a present position acquired therefrom. Assume that the vehicle 10 approaches the intersection where the vehicle 10 will change direction. In this case, if the vehicle 10 is close to the intersection within a predetermined distance such as 50 meters, then the navigation system 32 outputs a signal for indicating the change in direction. Alternatively, right after the vehicle 10 enters the intersection, the navigation system 32 may output the signal.

Furthermore, when the vehicle 10 is close to the intersection within a predetermined distance such as 300 meters, the navigation system 32 may output a signal for indicating the change in lane.

If the steering angle received from the steering angle sensor 33 is used, when the received angle is equal to/more than a predetermined value, the vehicle behavior sensing unit 30 may determine that the vehicle 10 starts changing direction. In addition, when the angle falls within the predetermined value, it may determine that the vehicle 10 finishes changing direction.

If the yaw rate value detected by the yaw-rate sensor 34 is used, when the detected value is equal to/more than a predetermined value, the vehicle behavior sensing unit 30 may determine that the vehicle 10 starts changing direction. In addition, when the value falls within the predetermined value, it determines that the vehicle 10 finishes the change.

Figure 4:
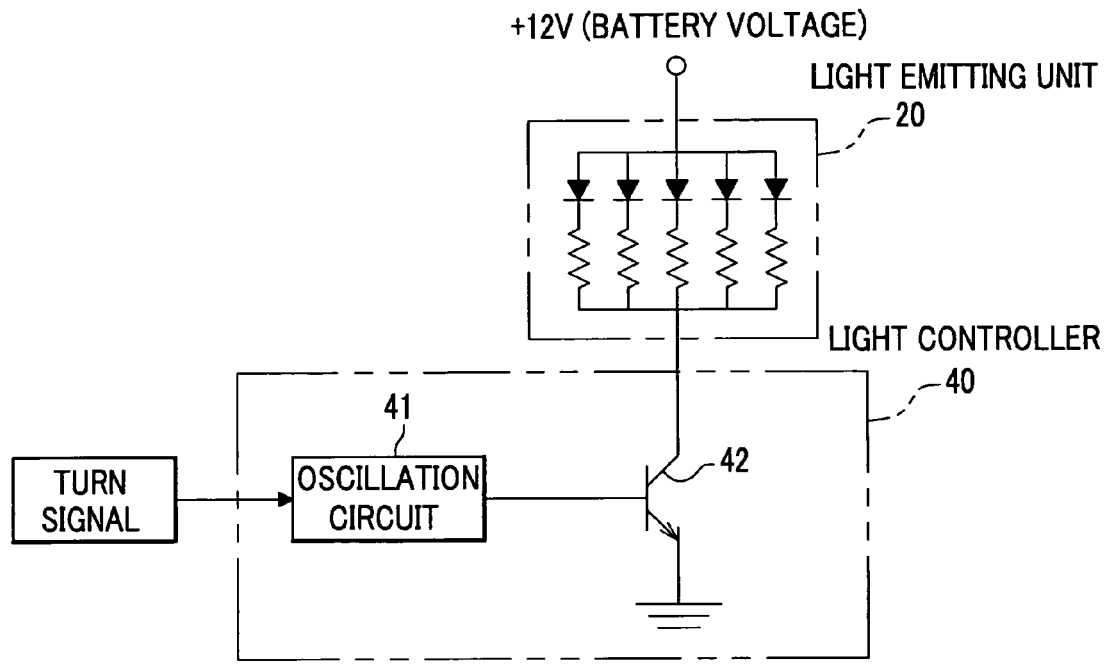
FIG. 4 is a view depicting a structure of the light emitting unit.

The light controller 40 controls the light emitting units 20 and 20. The light controller 40 turns on the light emitting unit 20 on the side where the vehicle 10 heads, in response to the signal from the vehicle behavior sensing unit 30. In order to turn on the light emitting unit 20, the light controller 40 has a circuit for supplying DC power or AC power of a predetermined frequency to the unit 20. Preferably, the predetermined frequency is 2 Hz to 10 Hz. If AC power is supplied, in other words, if the light emitting unit 20 flashes, then the light controller 40 may be composed of an oscillating circuit 41 and a transistor 42, as shown in FIG. 4. Alternatively, if complex computation needs to be carried out based on the signal from the vehicle behavior sensing unit 30, then the light controller 40 may include a power supply circuit and a microcomputer composed of a central processing unit (CPU) and a memory.

Figure 5:
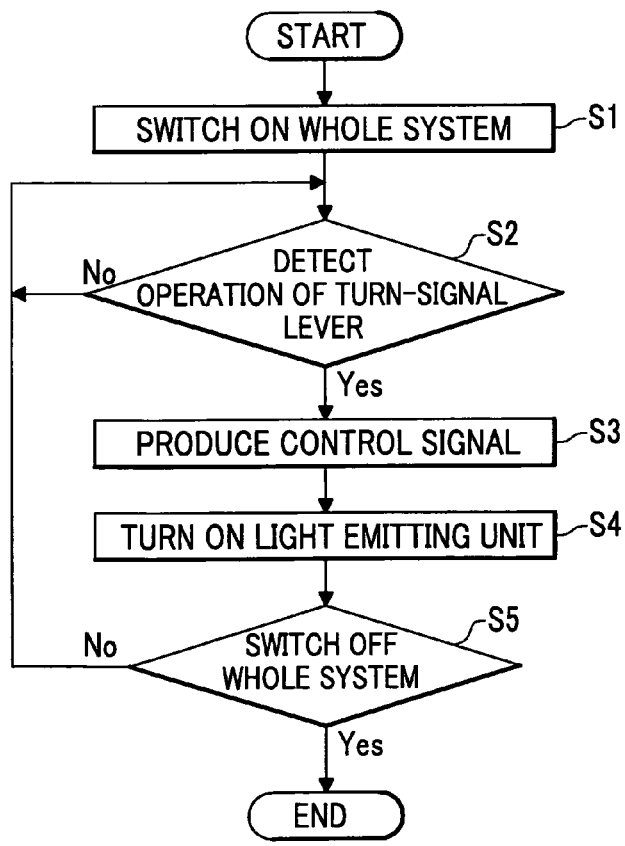
FIG. 5 is a flowchart of the operation of the driver-assistance vehicle according to the first embodiment.

Next, a detailed description will be given below, of an operation of the above-described driver-assistance vehicle A (driver-assistance device 1), with reference to a flowchart of FIG. 5. In this embodiment, the description will be given on the premise that only the mode of the turn-signal lever 31 is sensed. However, note that even if the information from the navigation system 32, steering angle sensor 33, yaw-rate sensor 34 or the combination thereof is used, the following operation does not differ greatly.

First, once the driver D enters the vehicle 10 and then turns on an ignition switch, the whole system of the driver-assistance device 1 is activated (S1). After the activation, the vehicle behavior sensing unit 30 continues sensing the mode of the turn-signal lever 31 ("NO" at S2). If the vehicle behavior sensing unit 30 senses the operation of the turn-signal lever 31 ("YES" at S2), then the light controller 40 produces a control signal such as a pulse signal (S3) and then outputs it to the light emitting unit 20. In this case, if the turn-signal lever 31 is shifted right, then the signal is sent to the right light emitting unit 20. In response to this signal, the light emitting unit 20 lights up (S4). The above steps S2 to S4 are repeated until the driver D turns off the ignition switch (S5).

In this way, the driver-assistance vehicle A turns on the light emitting unit 20 on the side where the vehicle 10 will head, in response to the operation of the turn-signal lever 31. Subsequently, the driver D notices the light from the light emitting unit 20 within his peripheral vision, and he then faces toward the light. As a result, the driver D visually checks the state of the area on the side where the light emitting unit 20 lights up. Thus, it is possible for the driver D to find obstacles or pedestrians surely, when the vehicle A changes direction or lane.

Second Embodiment

Now, a description will be given below, of a driver-assistance device according to a second embodiment of the present invention. A driver-assistance device of a second embodiment includes two light emitting units on the front door 21 of the assistant driver's seat. The two light emitting units are switched depending on whether or not a passenger exists on the assistant driver's seat AS. The driver-assistance device of the second embodiment is similar to that of the first embodiment. Therefore, the same reference numerals are given to the same parts as those already described in the first embodiment, and duplicate description is omitted.

Figure 6:
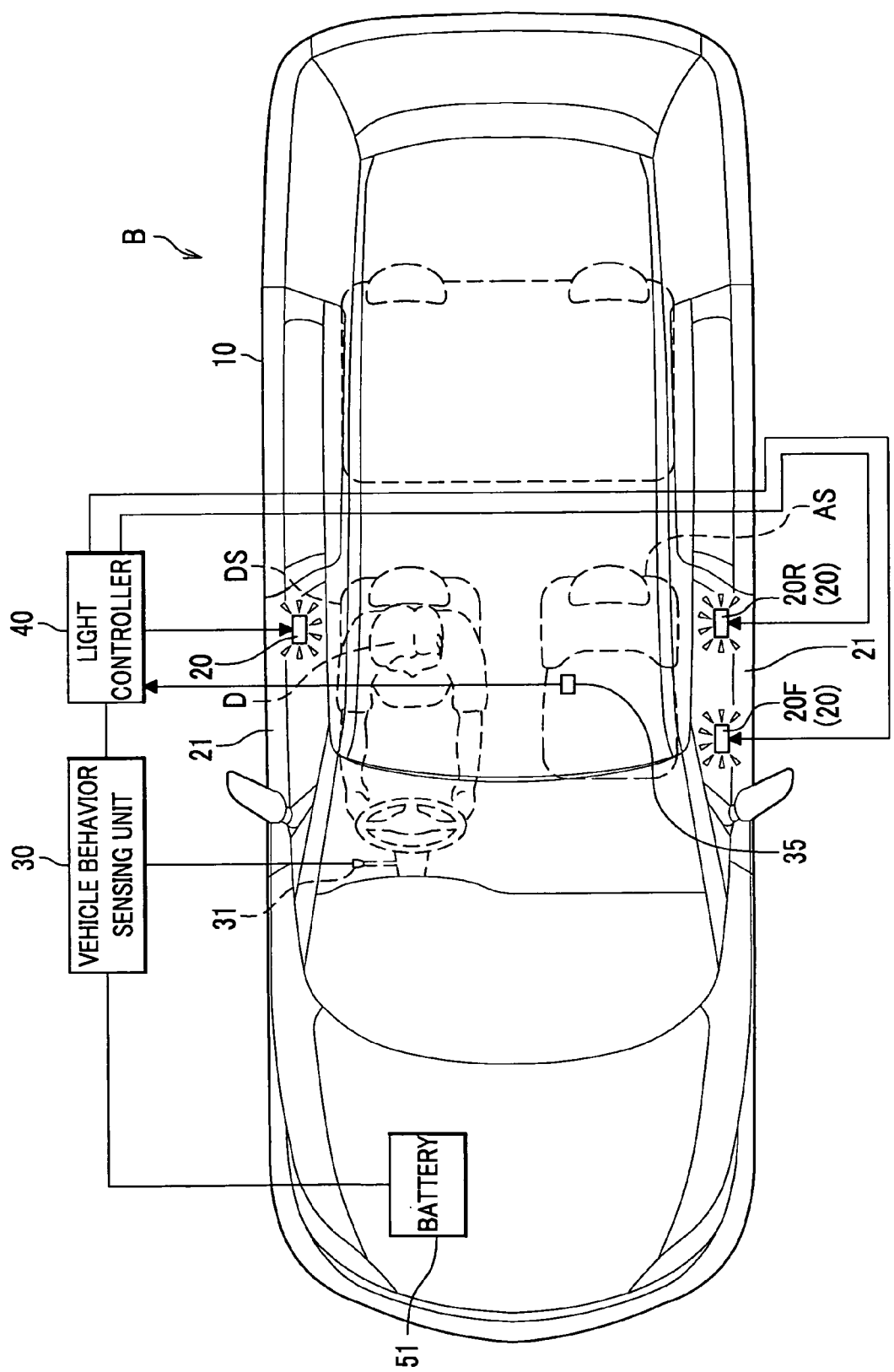
FIG. 6 is a plane view depicting a driver-assistance vehicle according to a second embodiment of the present invention.

Referring to FIG. 6, a driver-assistance vehicle B has two light emitting units 20 and 20 on the front door 21 of the assistant driver's seat AS. One of the light emitting units (called a "light emitting unit 20R") is placed just beside the head of the driver D, similar to the light emitting unit 20 on the side of the driver D. The other (called a "light emitting unit 20F") is placed about 30 cm to 50 cm forward from the light emitting unit 20R, similar to the left light emitting unit 20 of the first embodiment.

The assistant driver's seat AS is equipped with a seat sensor 35. This seat sensor 35 may be a known weight sensor, and it is located under a seat slide rail. With this seat sensor 35, the existence of a passenger on the assistant driver's seat AS can be sensed. Alternatively, the seat sensor 35 may be a known sensor installed at a buckle of a seat belt of the assistant driver's seat. In this case, a passenger on the assistant driver's seat AS can be sensed upon fastening of the seat belt. The sensing result of the seat sensor 35 is outputted to the light controller 40.

The light controller 40 controls the light emitting units 20, 20 and 20, based on the outputs of the vehicle behavior sensing unit 30 and the seat sensor 35. Specifically, if the weight sensed by the seat sensor 35 is greater than/equal to a predetermined value such as 100N, then the light controller 40 determines that a passenger sits on the assistant driver's seat AS, and then uses the light emitting unit 20F. Otherwise, the light controller 40 determines that the assistant driver's seat AS is empty, and then uses the light emitting unit 20R.

Figure 7:
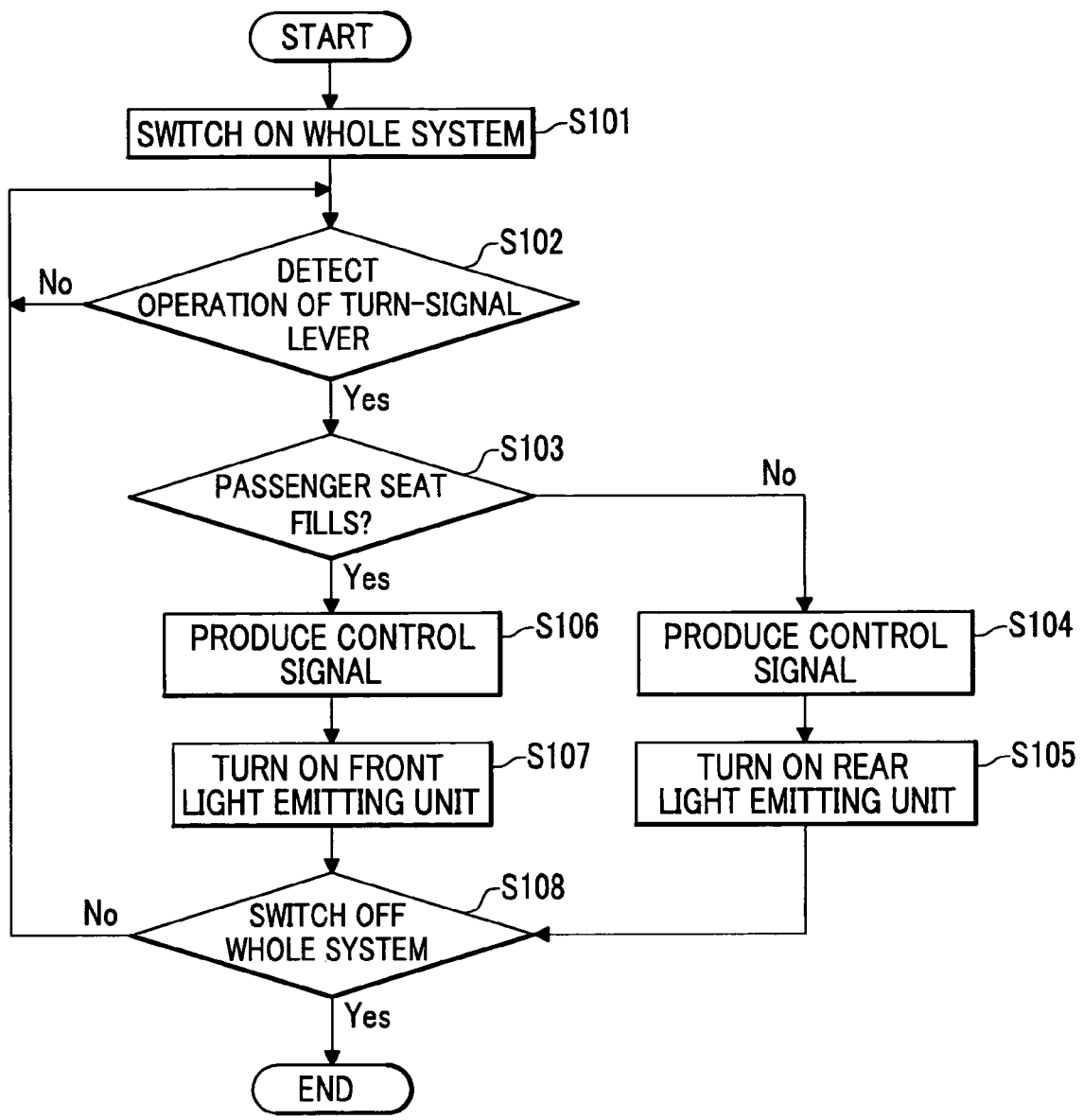
FIG. 7 is a flowchart of the operation of the driver-assistance vehicle according to the second embodiment.

Next, a description will be given below, of an operation of the driver-assistance vehicle B, with reference to a flowchart of FIG. 7. The operation will be described on the premise that only the mode of the turn-signal lever 31 is detected.

First, once the driver D enters the vehicle 10 and then turns on an ignition switch, the whole system of the driver-assistance device 1 is activated (S101). After the activation, the vehicle behavior sensing unit 30 continues sensing the mode of the turn-signal lever 31 ("NO" at S102). If the vehicle behavior sensing unit 30 senses the operation of the turn-signal lever 31 ("YES" at S102) and the vehicle 10 tries to turn to the side where the driver seat DS is located ("right" in FIG. 6), then the steps similar to those of the first embodiment is performed.

Alternatively, if the vehicle 10 tries to turn to the side of the assistant driver's seat AS ("left" in FIG. 6), then steps S103 to S108 are carried out. Specifically, the light controller 40 determines whether or not a passenger sits on the assistant driver's seat A, based on the output from the seat sensor 35 (S103) If a passenger is not determined to sit on the assistant driver's seat A ("NO" at S103), then the light controller 40 produces a control signal such as a pulse signal (S104), and then sends it to the light emitting unit 20R. In response to this signal, the light emitting unit 20R lights up (S105). Otherwise, if a passenger is determined to sit on the assistant driver's seat A ("YES" at S103), then the light controller 40 produces a control signal such as a pulse signal (S106), and then sends it to the light emitting unit 20F. In response to this signal, the light emitting unit 20F lights up (S107). The above-described steps S101 to S107 are repeated until the driver D switches off the ignition switch (S108).

In this way, the driver-assistance vehicle B turns on the light emitting unit 20 on the side where the vehicle 10 will head, in response to the operation of the turn-signal lever 31. The bright light within the peripheral of the driver D attracts the attention of the driver D, and he then faces toward the light.

If no one sits on the assistant driver's seat AS, then the light emitting unit 20R located just beside driver D lights up. Hence, the driver D notices the light from the light emitting unit 20F without difficulty. If a passenger sits there, then the light emitting unit 20F located in front of the unit 20R lights up. Accordingly, the driver D can see the light from the light emitting unit 20F in his peripheral vision without the interference of the passenger. As a result, the driver D visually checks the external area on the side where the light emitting unit 20 lights up. Thus, it is possible for the driver D to find obstacles or pedestrians surely, when the driver D changes direction or lane.

Note that the seat sensor 35 of this embodiment may not be a weight sensor. It may be any type of sensor as long as detecting the existence of a passenger. To give an example, the seat sensor 35 may has two connections under the support of the seat. When a passenger sits on the seat and the seat is then deformed, the connections are connected. By this connection, the existence of the passenger can be detected.

Third Embodiment

Next, a description will be given below, of a drive-assistance vehicle C according to a third embodiment of the present invention. In this embodiment, the light intensity of the light emitting units is varied in accordance with external darkness.

Figure 8:
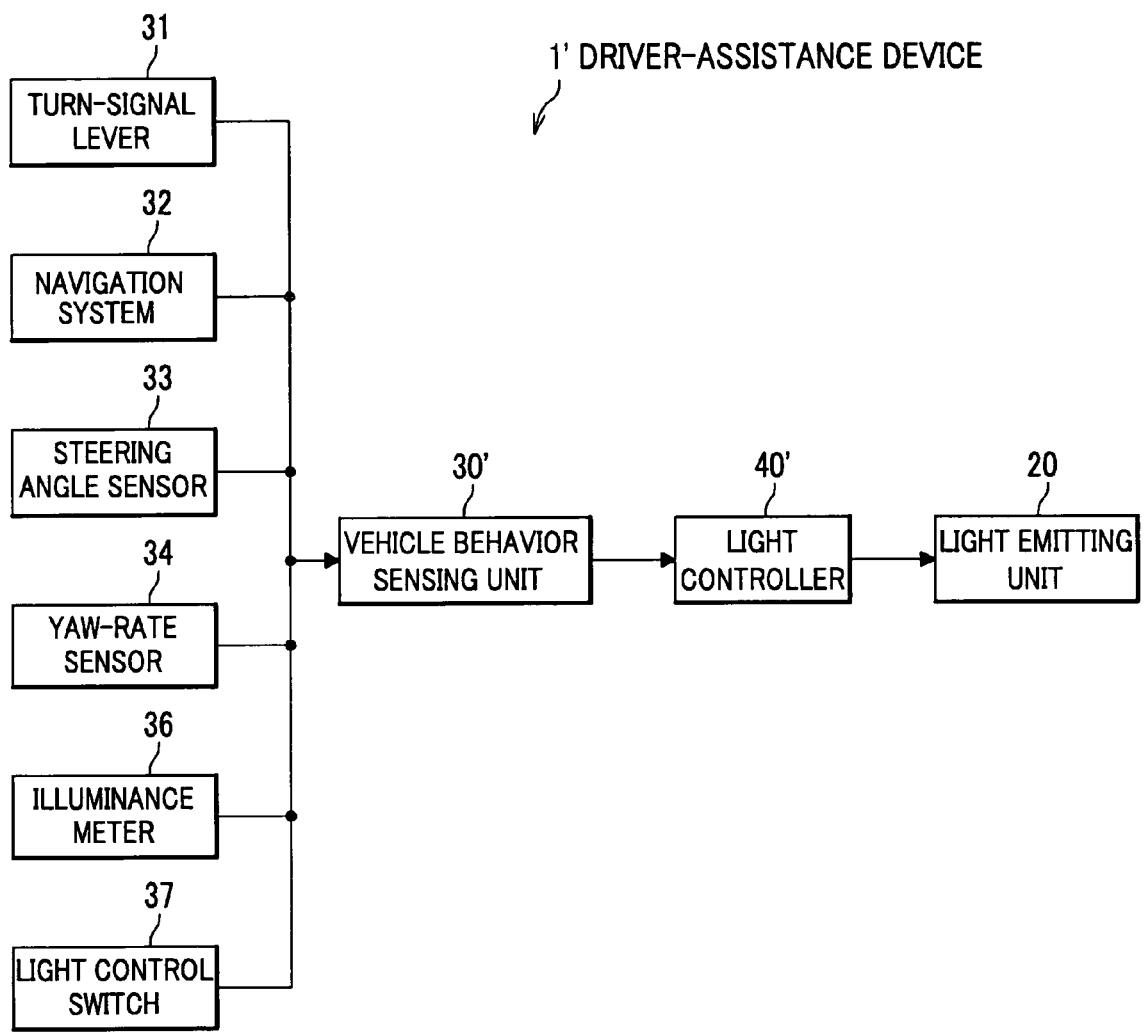
FIG. 8 is a block diagram depicting a driver-assistance device according to a third embodiment of the present invention.

Referring to FIG. 8, the structure of a driver-assistance device 1' is similar to that of the driver-assistance device 1 of the first embodiment except for an illuminance meter 36 and a light control switch 37.

The illuminance meter 36 is set on a dashboard of the vehicle 10, and senses illuminance thereon. The sensed value is outputted to the vehicle behavior sensing unit 30'. The light control switch 37 is used to turn on headlights and fog lamps or to vary the light intensity of the light emitting units. Generally, when it is dark outside, the headlights or the fog lamps are turned on. Therefore, in order to sense the illuminance outside the vehicle 10, the ON/OFF of the light control switch 37 may be detected, instead of the direct detection of the illuminance meter 36. The operation of the light control switch 37 is outputted to the vehicle behavior sensing unit 30'. The driver-assistance device 1' does not necessarily have both the illuminance meter 36 and the light control switch 37, and it may have either of them.

The vehicle behavior sensing unit 30' has a function of receiving signals from the illuminance meter 36 and the light control switch 37, in addition to the function of the vehicle behavior sensing unit 30 of the first embodiment.

The light controller 40' has a function of controlling the light intensity of the light emitting units, based on the sensing result of the vehicle behavior sensing unit 30', in addition to the function of the light controller 40 of the first embodiment. Specifically, the relationship between the sensed illuminance and the light intensity is memorized in the light controller 40' in advance. Following this, the light controller 40' manipulates the light emitting units 20 and 20 into lighting with light intensity determined based on the illuminance sensed by the illuminance meter 36. In the relationship, it is preferable that the light intensity is made higher as the illuminance increases.

Alternatively, the light controller 40' may not memorize the relationship, and may manipulate the light emitting units 20 and 20 into increasing the light intensity when the sensed illuminance exceeds a predetermined threshold value. If the signal from the light control switch 37 is used, when the light control switch 37 is ON, the light controller 40' decreases the light intensity of the light emitting units 20 and 20. This is because when the light control switch 37 is ON, it can be considered to be dark outside. Otherwise, if the light control switch 37 is OFF, then the light controller 40' increases the light intensity of the light emitting units 20 and 20. In order to vary the light intensity, one or more resistors simply need to be used.

Consider that the driver-assistance device 1' has both the illuminance meter 36 and the light control switch 37. If the sensed illuminance is low and the light control switch 37 is ON, then the light controller 40' decreases the light intensity of the light emitting units 20 and 20. When the sensed illuminance is high and the light control switch 37 is ON or when the sensed illuminance is low and the light control switch 37 is OFF, it is preferable that the light controller 40' increases the light intensity of the light emitting units 20 and 20. This is because it appears that the illuminance meter 36 is covered by something or the driver D forgets to turn off the lights.

With the driver-assistance device 1', the light emitting units 20 and 20 light up brightly during daytime, so that the driver D notices the light from the light emitting units 20 and 20 clearly. In addition, they light up darkly at night, thereby preventing the driver D from being affected excessively.

Fourth Embodiment

Next, a description will be given, of a drive-assistance vehicle C according to a fourth embodiment of the present invention. In this embodiment, the drive-assistance vehicle C uses a color of a high attention value, instead of the light sources.

Figure 9:
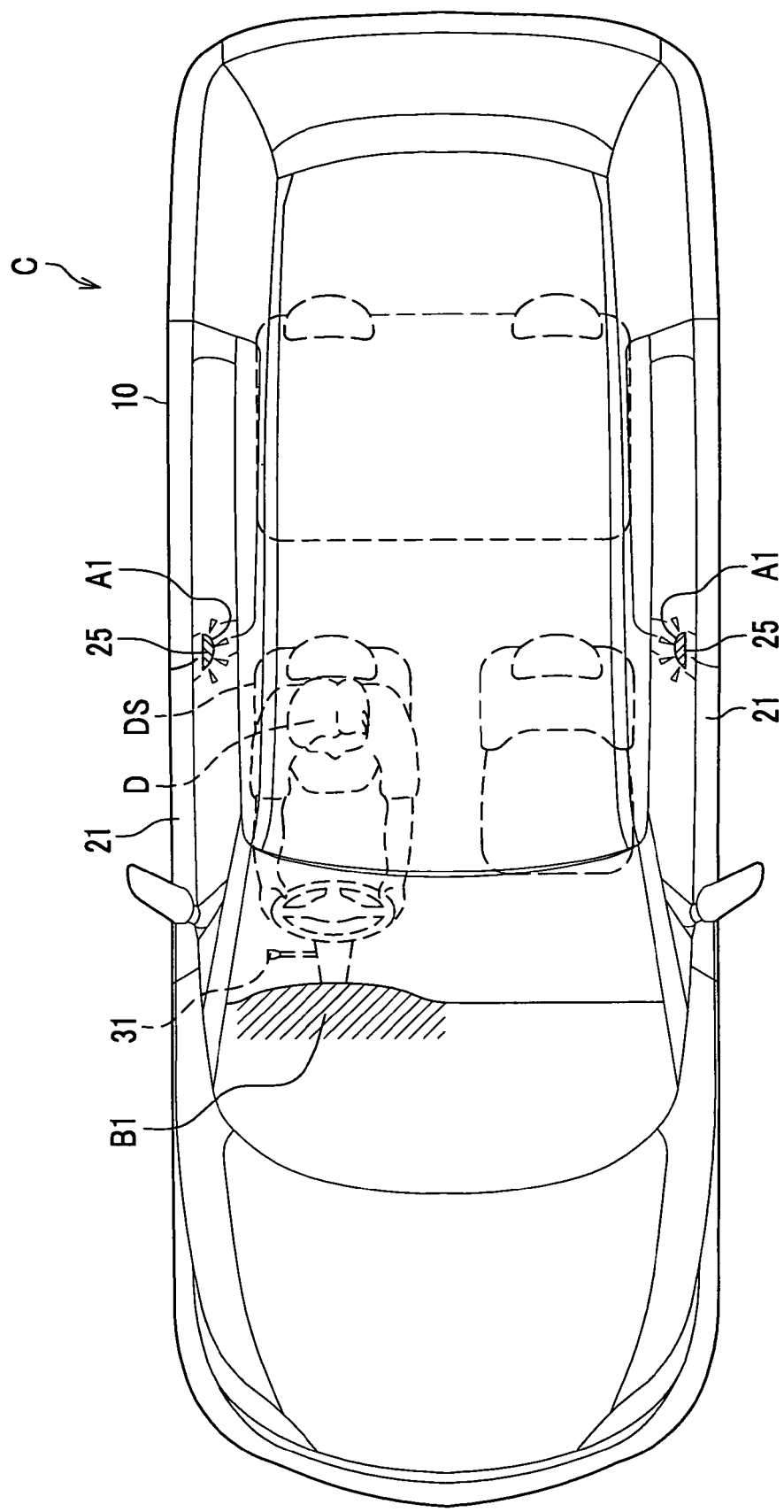
FIG. 9 is a plane view depicting a driver-assistance vehicle of a fourth embodiment of the present invention.

Referring to FIG. 9, a driver-assistance vehicle C according to a fourth embodiment of the present invention has regions Al and A1 on pillars (also called B pillars) on both sides of the driver seat DS, respectively. Each region A1 is painted a color of a higher attention value than that of the surrounding areas. A color of a high attention value means a conspicuous color including yellow, orange and red. Meanwhile, a color of a low attention value includes blue and black.

Figure 10:
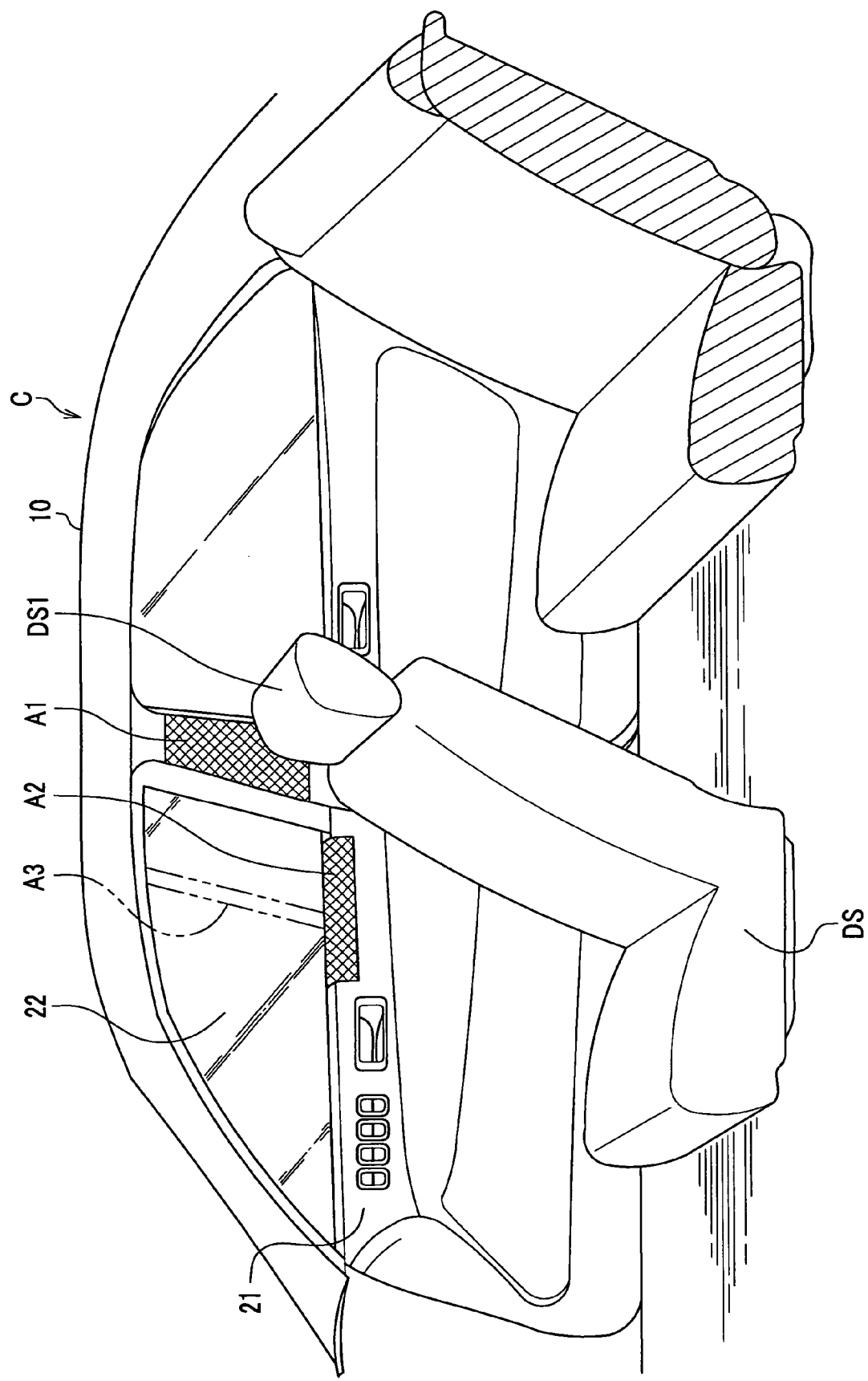
FIG. 10 is a view depicting a right (driver) side of a vehicle which is seen from the interior.

Referring to FIG. 10, the region A1 ranges from the upper to lower portions of the window 22. Moreover, the region A1 is located just beside the driver seat DS, but this location may be shifted in accordance with the build of the driver D.

In this driver-assistance vehicle C, when changing direction or lane, the driver D turns his head away slightly. Then, the driver D notices the region A1 within his peripheral vision, and further turns his head laterally. Consequently, the driver-assistance vehicle C allows the driver D to be aware of other vehicles or pedestrians walking across an intersection.

Preferably, an area in front of the driver D is painted a color of a low attention value. To illustrate, a region B1 on a dashboard as shown in FIG. 9 or a region around a meter panel (not shown) is blackened. Because of the contrast between the regions A1 and B1, the region A1 looks more conspicuous. Alternatively, if the color of the region A1 is yellow, then the meter panel may be painted blue which is a complementary color of yellow. This makes it possible to render the region A1 more conspicuous.

Now, a description will be given below, of a first variation of this embodiment, with reference to FIG. 10. A region A2 of a high attention value is placed below the window of the front door 21. In this case, this region A2 may be formed by painting an area that is 40 cm to 50 cm away from the rear edge of the front door 21. Furthermore, a region on the side of the assistant driver's seat AS may be painted in the similar fashion. In addition, this painted region is 10 cm wider than the region A2 in the forward direction, so that the painted region is prevented from being hidden by a passenger on the assistant driver's seat. Moreover, the region A2 may extend 40 cm forward and 10 cm backward with reference to the front surface of the head rest DS1. In this way, due to the fact that region A2 has a sufficient width, the effect of this embodiment can be achieved regardless of the build of the driver D. However, the size of the region A2 may be limited to the above one. Alternatively, the region A2 may have any size as long as the driver B can notice it. For example, its size may be 15 mm square.

Furthermore, as shown in FIG. 10, the region of a high attention value may have a long, narrow shape, and be placed on the window glass 22 of the front door 21. In this case, this region is created by sticking a yellow tape on the window, and this position may be shifted in accordance with the build of the driver D.

Figure 12:
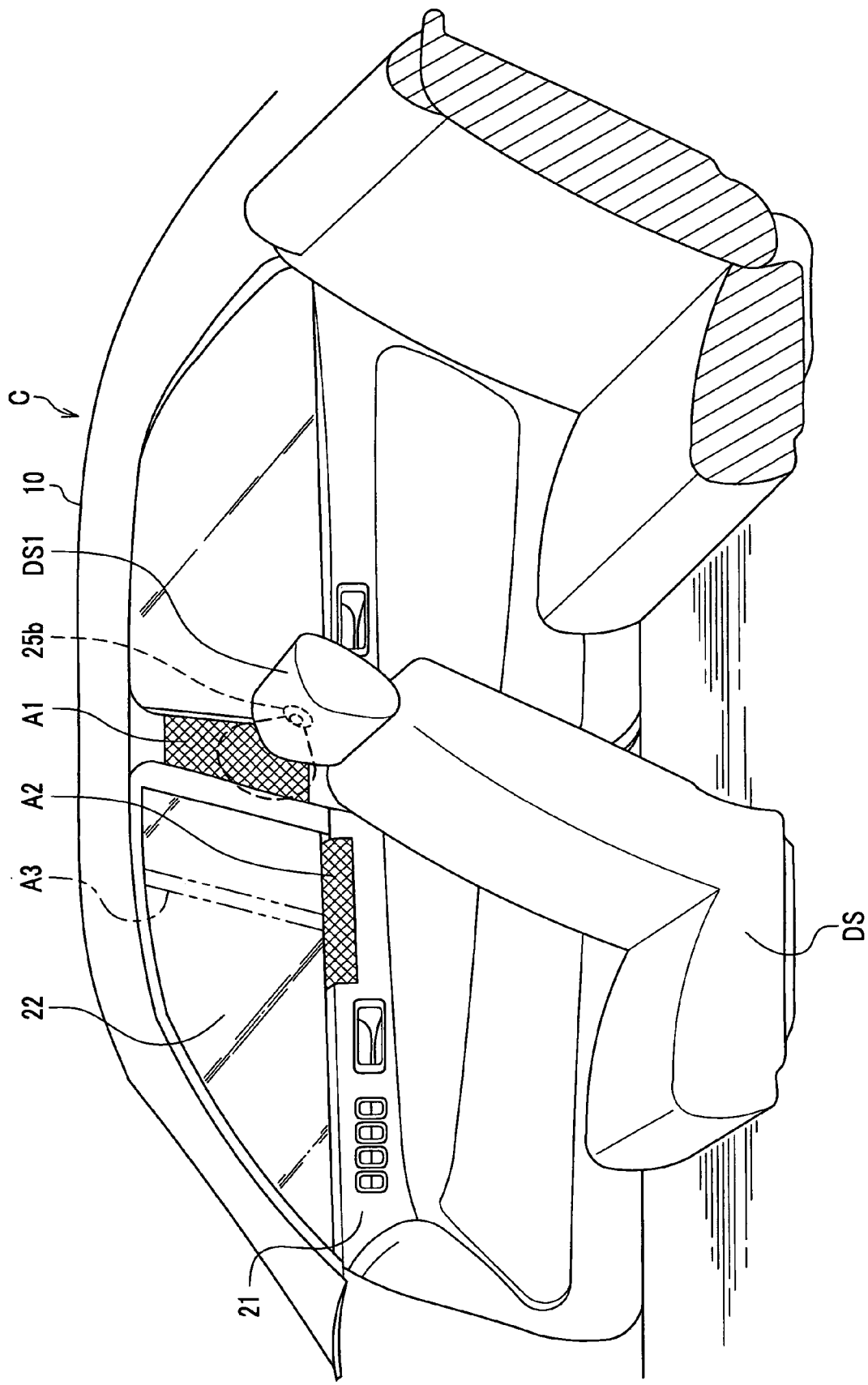
FIG. 12 is a view depicting the first variation of the fourth embodiment.
Figure 13:
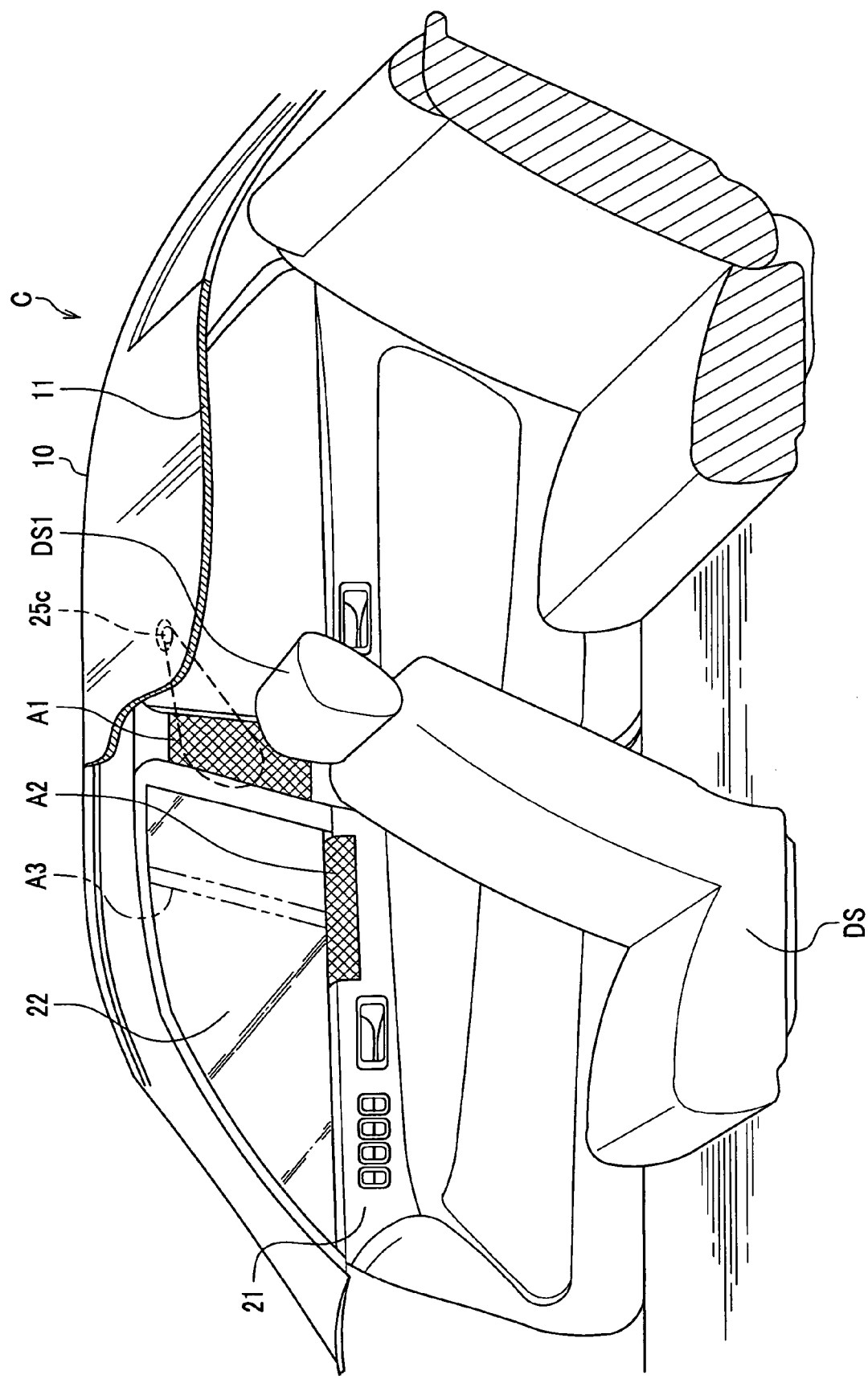
FIG. 13 is a view depicting a second variation of the fourth embodiment.

Next, a description will be given below, of a second variation of this embodiment, with reference to FIGS. 11 to 13. In this variation, an illumination lamp is used at night.

Figure 11:
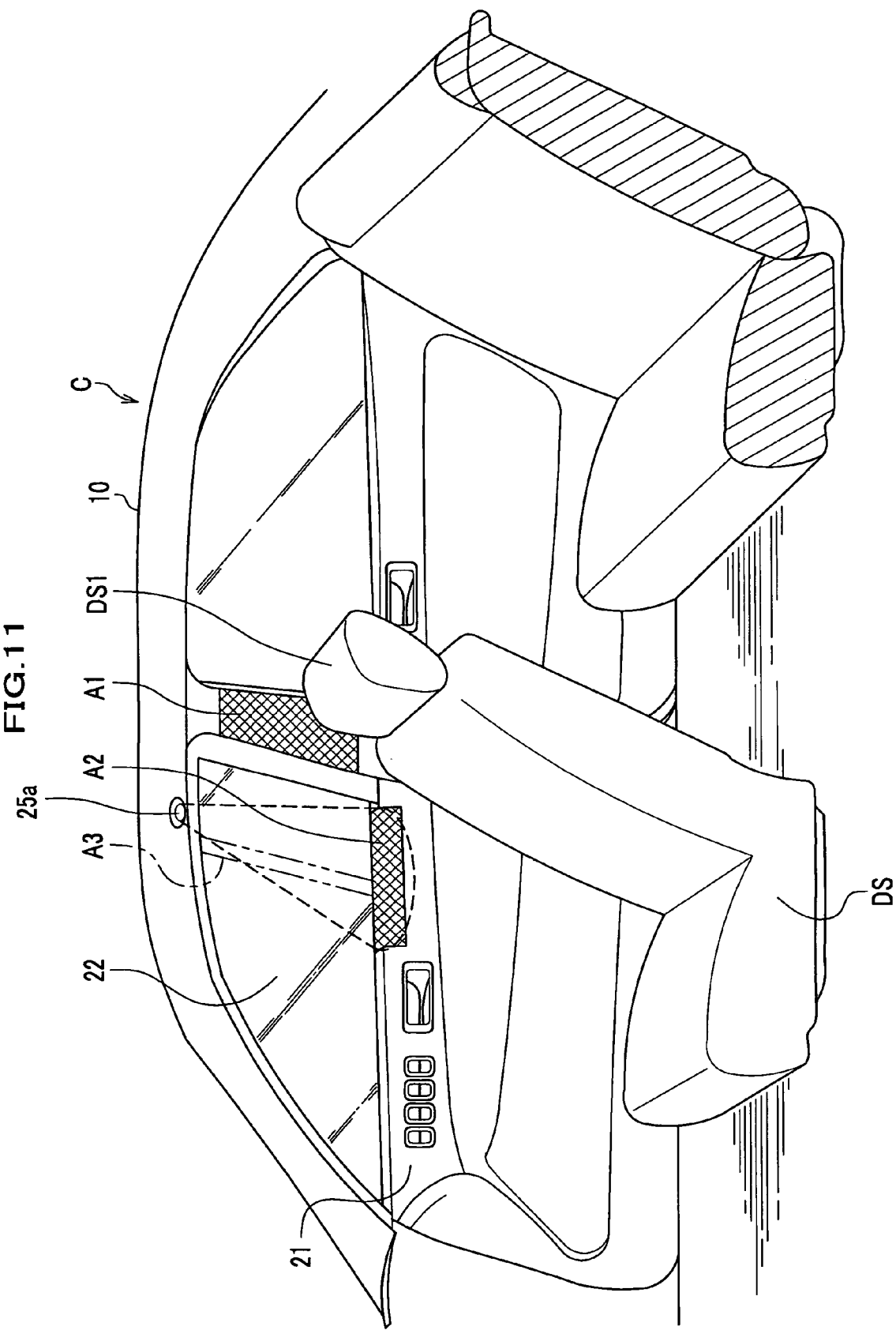
FIG. 11 is a view depicting a first variation of the fourth embodiment.

Specifically, as shown in FIG. 11, an illumination lamp 25a for irradiating the region A2 is provided on a side garnish above the front door 21. This lamp is turned ON only when the vehicle 10 changes direction or lane at night. As shown in FIG. 12, the illumination lamp 25b may be placed on the head rest DS1 of the driver seat DS with facing the region A1. Furthermore, as shown in FIG. 13, the lamp 25c may be located on a ceiling 11 of the vehicle 10. In order to determine whether it is night or not, a threshold value may be set in the way similar to that of the third embodiment. In addition, a way to determine that the vehicle 10 changes direction or lane may be similar to that of the first embodiment. With the above illumination lamp, the region of a high attention value can be noticed by the driver D more readily.

EXAMPLE 1

A description will be given, of examples of the embodiments of the present invention.

In Example 1, the driver-assistance vehicle A of the first embodiment was used to conduct a test. The vehicle behavior sensing unit 30 sensed the operation of the turn-signal lever 31.

Three human subjects each turned the vehicle A right or left three times. In addition, angles at which the viewpoint of each subject moves were measured by an eye camera. The front of the vehicle A was set to 0 degree. As the angle was wider, the subject paid attention more carefully. The test was performed on the two conditions; first the light emitting units 20 flashed at a frequency of 10 Hz (Example A) and second it merely lighted (Example B). The subjects underwent the test in vehicles with and without the driver-assistance device 1. The Result of the test was revealed in FIGS. 14A and 14B. These graphs showed averaged values.

Figure 14A:
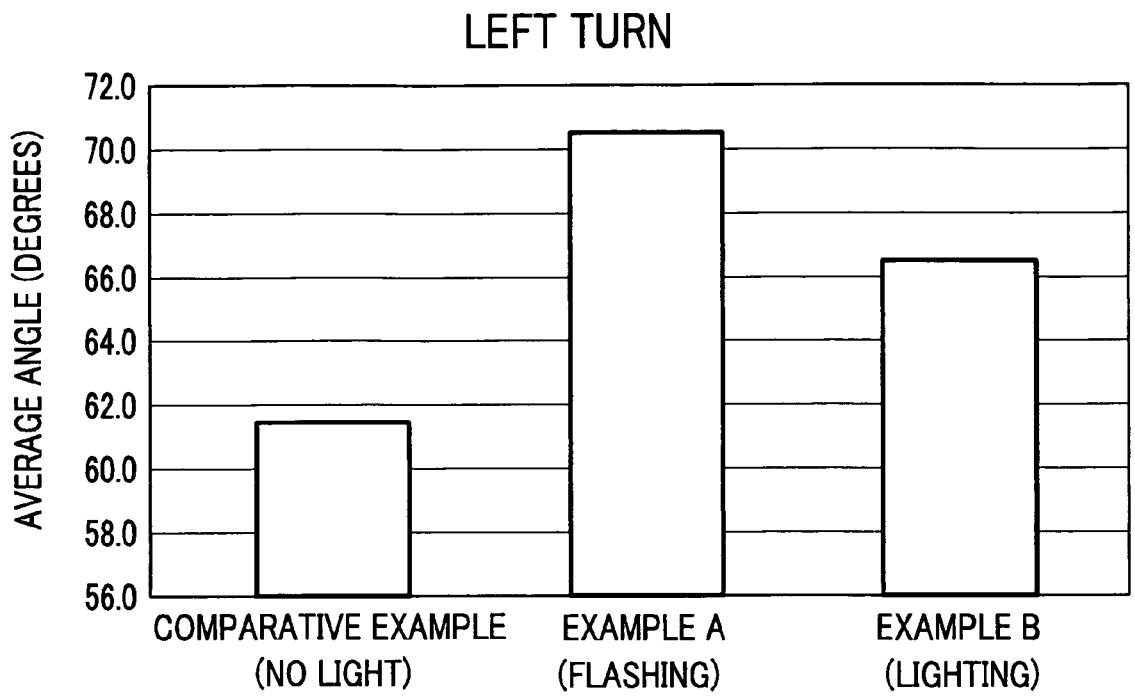
FIG. 14A is a graph of an example 1, which shows an angle of the viewpoint of human subjects when the subjects turn the vehicle left.
Figure 14B:
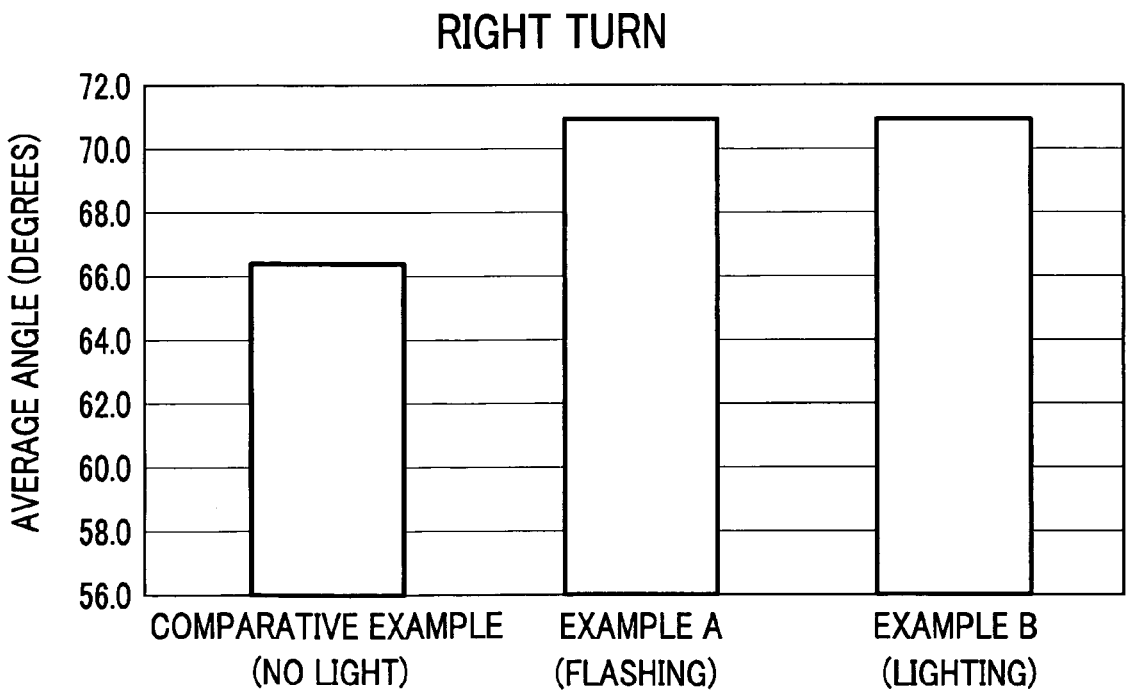
FIG. 14B is a graph of an example 1, which shows an angle of the viewpoint of human subjects when the subjects turn the vehicle right.

It could be cleared from FIGS. 14A and 14B that the angle of viewpoint of each subject in Example 1 was broader than that in Comparative Example. In addition, the case where the light emitting units 20 flashed was more effective than the case where it merely lighted.

EXAMPLE 2

In this example, a driving simulator was used to simulate the effect of the driver-assistance vehicle C of the fourth embodiment.

Figure 15A:
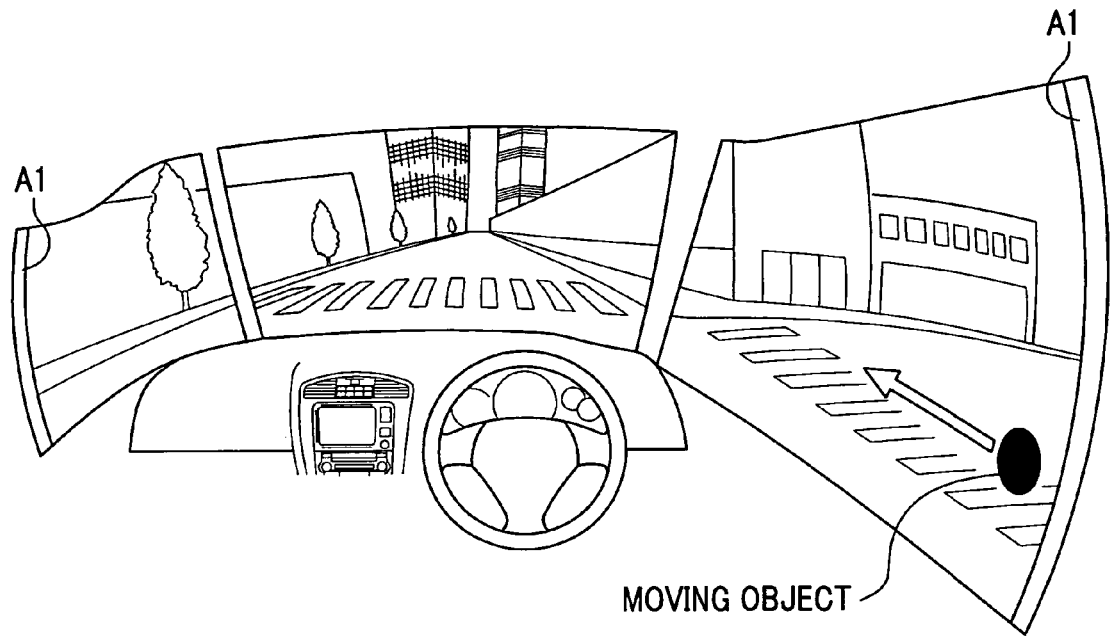
FIG. 15A is a view showing a driving simulator.
Figure 15B:
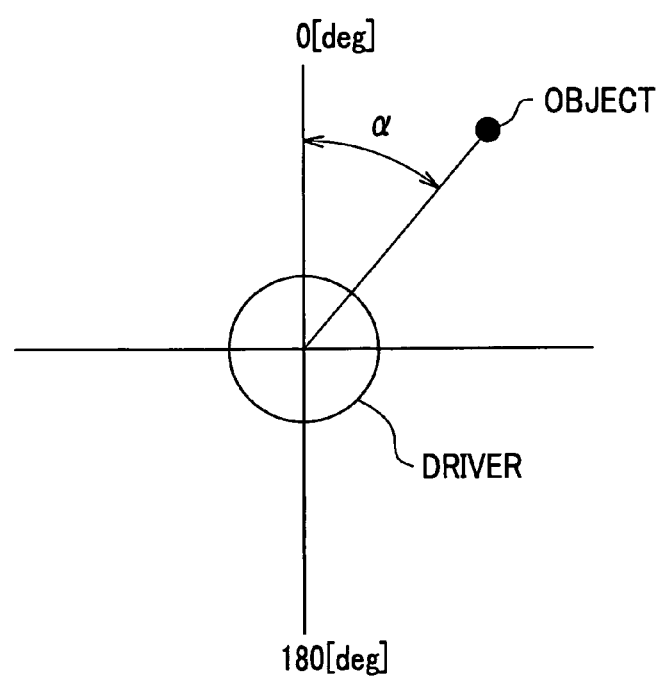
FIG. 15B is a view showing the angle of an object.

Referring to FIG. 15A, the driving simulator displayed sceneries seen from the window and inside the vehicle around the driver seat. This enabled the subjects to drive virtually.

The driving simulator showed a partially yellow-painted pillar (B pillar) next to the driver seat, and a blue-painted instrumental panel. Moreover, it showed a black circular object that travels from the side to the front. A spot at α degrees was defined as a start point. A period from the time when the object started traveling at the start point to the time when the object was found by the subject was measured. The value of α was varied.

Three subjects underwent the above test, and resulting values were averaged. In addition, the similar test was performed on the condition that both the instrumental panel and the B pillar were blackened. The resulting values were shown as Comparative Examples.

Figure 16:
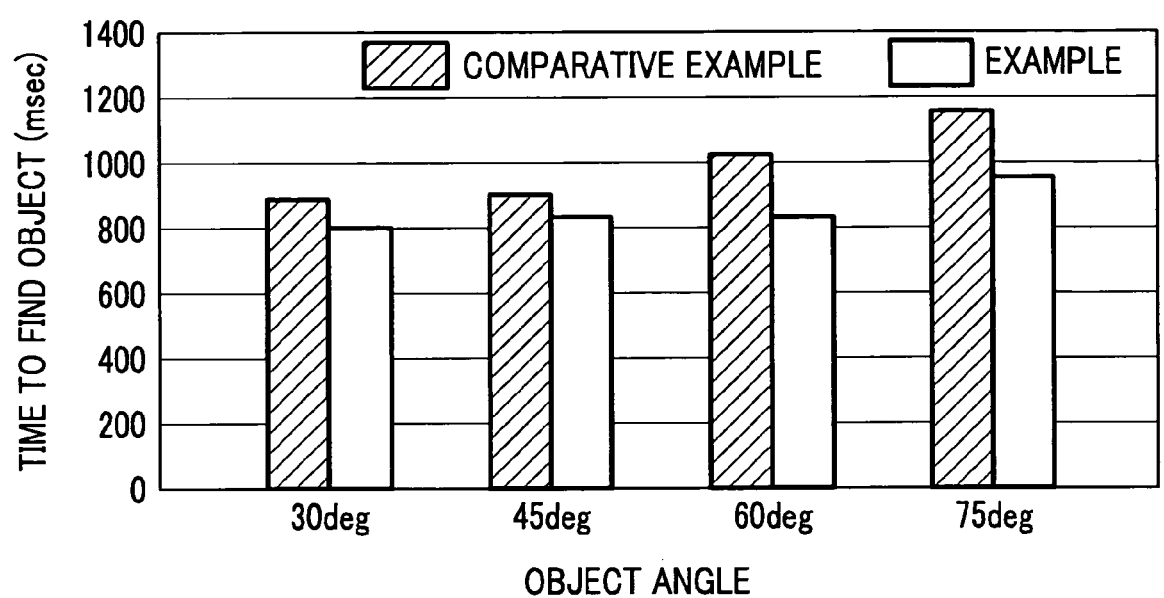
FIG. 16 is a graph showing a period until the subjects find the object in an example 2.

Referring to FIG. 16, in any case where the start angle 60 was changed to 30, 45, 60 and 75 degrees, it could be found that the period of Example 2 was shorter than that of Comparative Example.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A driver-assistance vehicle comprising:
   a light emitting unit located inside the vehicle within peripheral vision of a driver of the driver-assistance vehicle;
   a vehicle behavior sensing unit for predicting or sensing a state of the vehicle;
   a light controller for controlling the light-emitting unit based on the sensed state; and
   at least one additional light emitting unit located inside the vehicle, wherein the light emitting units are arranged on opposite sides of the vehicle,
   wherein the driver of the driver-assistance vehicle is assisted in distributing his attention.

2. The driver-assistance vehicle according to claim 1,
   wherein the vehicle behavior sensing unit senses a signal outputted from a turn-signal of the vehicle when the turn-signal lights up, and
   wherein when the vehicle behavior sensing unit senses the signal, the light controller turns on one or some of the light emitting units on the side where the turn signal flashes.

3. The driver-assistance vehicle according to claim 1,
   wherein the vehicle behavior sensing unit determines whether or not the vehicle will change direction or lane, through a navigation system, and
   wherein when the vehicle behavior sensing unit determines that the vehicle will change direction or lane, the light controller turns on one or some of the light emitting units on the side where the vehicle will change direction or lane.

4. The driver-assistance vehicle according to claim 1,
   wherein the vehicle behavior sensing unit determines whether or not the vehicle will change direction or lane, through a steering angle sensor, and
   wherein when the vehicle behavior sensing unit determines that the vehicle will change direction or lane, the light controller turns on one or some of the light emitting units on the side where the vehicle will change direction or lane.

5. The driver-assistance vehicle according to claim 1,
   wherein the vehicle behavior sensing unit determines whether or not the vehicle will change direction or lane, through a yaw rate sensor, and
   wherein when the vehicle behavior sensing unit determines that the vehicle will change direction or lane, the light controller turns on one or some of the light emitting units on the side where the vehicle will change direction or lane.

6. The driver-assistance vehicle according to claim 1,
   wherein the vehicle behavior sensing unit senses external illuminance, and
   wherein the light controller varies light intensities of the light emitting unit in accordance with the sensed illuminance.

7. The driver-assistance vehicle according to claim 1,
   wherein the light emitting unit flashes at a frequency of 2 Hz to 10 Hz.

8. The driver assistance vehicle according to claim 1, further comprising:
   a seat sensor for determining whether a passenger sits in an assistant driver's seat; and
   an alternate light emitting unit located inside the vehicle on a side of the vehicle corresponding to the assistant driver's seat, wherein the light controller controls the alternate light emitting unit based on an output of the vehicle behavior sensing unit and an output of the seat sensor.

* * * * *